Aug. 17, 1937.　　　H. M. GROOMES　　　2,090,196
PACKLESS STEAM VALVE
Filed Aug. 3, 1936
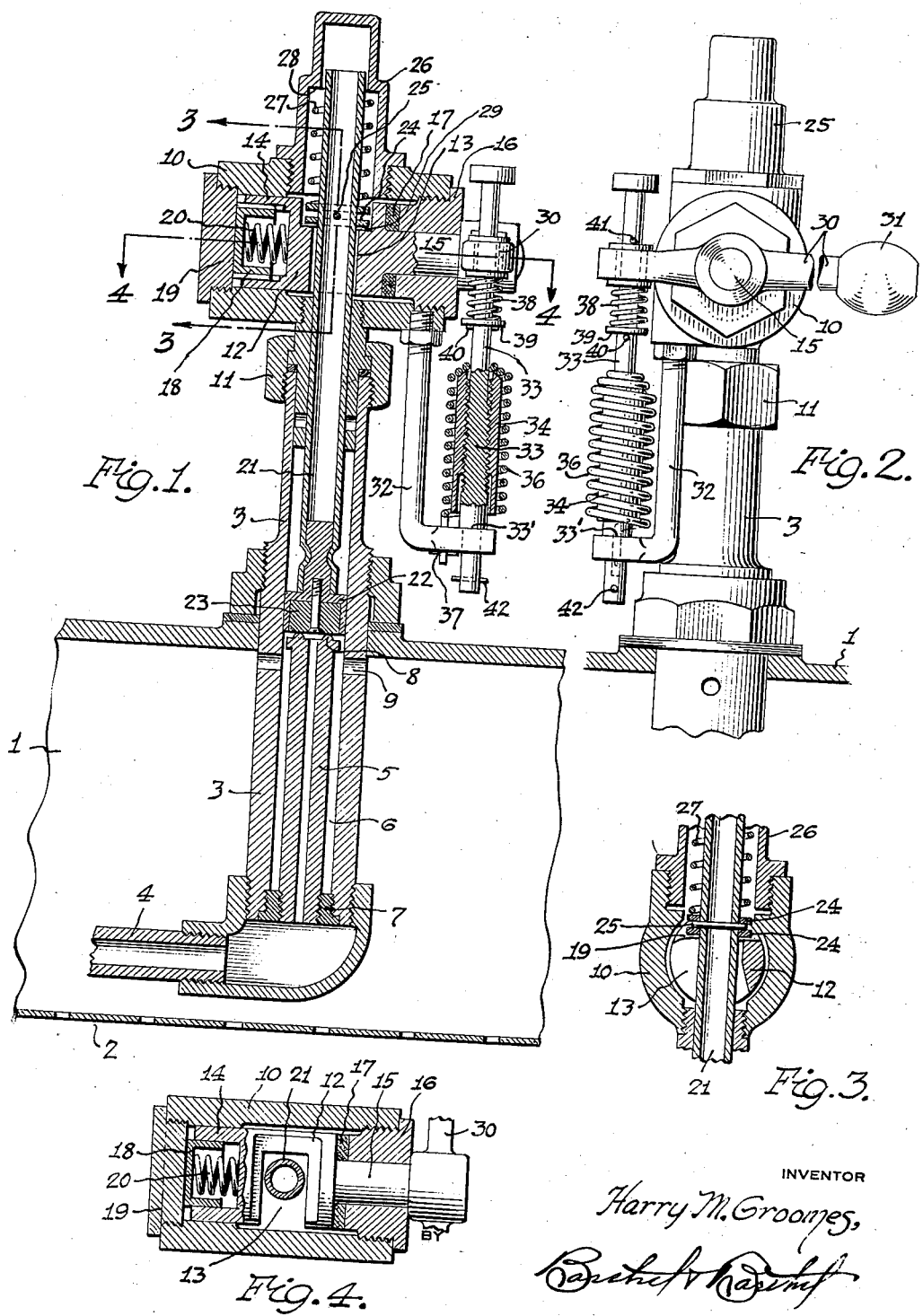
INVENTOR
Harry M. Groomes,
ATTORNEYS Patented Aug. 17, 1937

2,090,196

UNITED STATES PATENT OFFICE 2,090,196

PACKLESS STEAM VALVE

Harry M. Groomes, Whitmore Lake, Mich., assignor to Rosa K. Groomes, Whitmore Lake, Mich.

Application August 3, 1936, Serial No. 94,032

5 Claims. (Cl. 251—132)

The present invention pertains to a novel steam, liquid or air valve, and the principal object is to provide a device of this character which requires no packing. This type of valve is particularly useful in clothes pressing machines or air controlled machines where small quantities of steam or air are required at intervals.

According to the invention, the fluid supply pipe has a valve seat at the open end thereof, and in line with the pipe is a valve stem carrying a head adapted to close upon the seat under the action of a spring. The valve stem passes through a rocker member and has an abutment bearing upon this member in such a manner that movement of the rocker in either direction lifts the valve stem away from the valve seat and thus opens the fluid pipe. On release of the rocker, the valve is closed by the action of the spring which was previously compressed.

The rocker has two bearings in a housing, and one of the bearings is entirely sealed off by a plug. At the other bearing, a portion of the rocker must necessarily extend through the housing in order to carry the operating arm. The latter bearing is sealed by a gasket which is normally compressed by a spring at the opposite end of the rocker.

The invention further embodies a spring device for rapidly returning the rocker member to its normal position after it has been moved by the operating arm and the arm released. The spring device is made adjustable to compensate for wear between the rocker and the parts of the valve structure frictionally engaged thereby.

The invention is fully disclosed by way of example in the following description and in the accompanying drawing in which—

Figure 1 is a sectional view of the device;

Fig. 2 is an elevation thereof at right angles to Fig. 1;

Fig. 3 is a section on the line 3—3 of Fig. 1; and

Fig. 4 is a section on the line 4—4 of Fig. 1.

Reference to these views will now be made by use of like characters which are employed to designate corresponding parts throughout.

In Figure 1 is illustrated a steam head or chamber 1 of the type used for example in clothes pressing machines. The bottom of the head is perforated at 2 to permit flow of steam to the garment which is being pressed.

A pipe 3 extends into the head and is connected within the head to a steam supply pipe 4 which delivers steam to the pipe 3 from any suitable source. Another pipe 5 is secured within the pipe 3 in spaced relation to form a concentric annular passage 6 which however is closed to the pipe 4 by a ring plug 7. The upper end of the pipe 5 is formed with a valve seat 8, and the pipe 3 has ports 9 within the head 1. Thus, if the valve seat 8 is unobstructed, steam will flow from the pipe 4 upwardly through the pipe 5 and through the ports 9 to the head 1 and apertures 2.

A valve housing 10 of generally cylindrical formation is secured on the upper end of the pipe 3 by means of a coupling 11. In this member is rotatably mounted a rocker member 12 having a slot 13 cut therethrough, as shown in Fig. 3, for a purpose which will presently be described. One end of the rocker member 12 is enlarged at 14 and journalled in one end of the member 10, while the other end of the rocker is formed with a stem 15 journalled in a plug 16 screwed into the remaining end of the body 10 and compressing a gasket 17 against the body of the member 12.

In the enlarged end 14 of the member 12 is keyed a cup member 18 which has its back against a plug 19 threaded into the adjacent end of the member 10. A spring 20 is compressed between the cup 18 and the adjacent end of the member 12 whereby said member is held resiliently against the packing 17. The spring is preferably secured to both the members 12 and 18, so that when the member 12 is turned by the means presently to be described, there is merely surface friction between the members 18 and 19 without distorting the spring 20.

The valve proper comprises a tubular stem 21 received in the upper portion of the pipe 3 and extending upwardly through the slot 13. The lower end of the stem carries a head 22 having a fiber insert 23 adapted to close upon the seat 8. Above the member 12, the stem 21 carries a pair of washers 24 spaced by a pin 25. A cap 26 is screwed into the top of the body 10 to cover the upper end of the stem 21 and contains a spring 27 which rests on the upper washer 24 and bears upwardly against a shoulder 28 formed in the cap. The washers are so related to the top of the member 12 as to permit the spring 27 to hold the fiber valve head 23 upon the seat 8. In fact, it is preferred to allow a slight clearance between the lower washer 24 and the top of the member 12 when the member 23 is normally on the seat 8, to ensure closing of the upper end of the pipe 5 even after the seating face of the member 23 has worn.

The previously mentioned means for turning the rocker 12 consists of an arm 30 secured to the member 12 exteriorly of the nut 16 and formed with a handle 31. It will be seen that a swinging of the arm in either direction turns the rocker 12 and causes the disks to be lifted, carrying with them the pin 25 and valve stem 21. This movement of the valve stem uncovers the seat 8 and permits steam to reach the apertures 9 from the upper end of the pipe 5. The spring 27 is compressed by this upward movement of the valve stem and therefore returns the valve to closed position when the handle 31 is released.

The arm 30 is also spring held in order to return to normal position when released. For this purpose a depending bracket 32 is secured to the valve body 10 and has the lower end of a rod 33 slidably mounted therein. Downward movement of the rod is limited by a shoulder 33' thereon adapted to rest on the bracket. The upper end of the rod passes through the arm 30. A barrel 34 is adjustably threaded on the rod 33 between the bracket 32 and rod 30 and is surrounded and held down by a spring 36 which has its lower end anchored in the bracket as at 37. Another spring 38 surrounds the rod 33 immediately beneath the arm 30 and bears downwardly upon a washer 39 which rests on a pin 40 in the rod. The downward pull on the rod caused by the spring is limited by a pin 41 in the rod above the arm 30. Upward movement of the rod by a downward pull on the handle 31 is limited by a pin 42 in the rod below the bracket 32.

A downward pull on the handle 31 thus raises the rod 33 while opening the valve and also stretches the spring 36. When the handle is released, the spring immediately returns the arm 30 to its normal position. The spring 38 acts as a buffer to take up the inertia of the adjacent end of the arm 30 when the rod 31 comes to rest after having been pulled down by the spring 36. The valve is intended to be rather delicate in the sense that it is designed to release small quantities of steam in a pressing machine. The operator can usually control the amount for opening of the valve by the pressure he applies to the member 31. By means of the adjustable depending bracket 32, the rest angle of the handle may be adjusted to compensate for wear between the parts 12 and 24, so that a constant relation may be maintained between the amount of valve opening and the extent of handle displacement.

By means of the spring device and barrel, the spring 36 may be adjusted for the desired tension. When the rod 33 is adjusted, the threaded barrel is elevated, thereby expanding the spring 36 which is anchored at 37.

It will also be seen that the valve requires no packing to prevent the escape of steam. The supporting structure consisting of the pipe 3 and housing 10 is sealed around the valve stem by the coupling 11 and cap 26. One end of the housing 10 is entirely sealed by the plug 19. At the other end, where the stem 15 must pass through the plug 16 for carrying the external arm 30, the bearing is sealed by the gasket 17 which is constantly compressed by the spring 20.

Although a specific embodiment of the invention has been illustrated and described, it will be understood that various alterations in the details of construction may be made without departing from the scope of the invention as indicated by the appended claims.

What I claim is:—

1. A valve comprising a rigid supporting structure, a pipe therein and having a valve seat at one end thereof, a rocker member rotatably mounted in said supporting structure on an axis perpendicular to that of said pipe, said member being slotted, a valve stem passing through the slot of said member, a valve head on said stem and adapted to close against said valve seat, an abutment carried by said valve stem and resting upon said rocker member, whereby turning of said member lifts said stem from said valve seat, a spring bearing upon said abutment and normally holding said valve head against said valve seat, a pair of plugs in said supporting structure at the ends of said rocker member, a cup slidably mounted in one end of said rocker member, a spring inserted in said end and holding said cup against the adjacent plug, and a gasket inserted between said rocker member and the remaining plug to be compressed by the last named spring.

2. A valve comprising a rigid supporting structure, a pipe therein and having a valve seat at one end thereof, a rocker member rotatably mounted in said supporting structure on an axis perpendicular to that of said pipe, said member being slotted, a valve stem passing through the slot of said member, a valve head on said stem and adapted to close against said valve seat, an abutment carried by said valve stem and resting upon said rocker member, whereby turning of said member lifts said stem from said valve seat, a spring bearing upon said abutment and normally holding said valve head against said valve seat, an arm secured to said rocker member exteriorly of said supporting structure for turning said member, a bracket depending from said supporting structure, a rod passing through said bracket and attached to said arm, and a spring connecting said bracket and rod to be tensioned by movement of said rod.

3. A valve comprising a rigid supporting structure, a pipe therein and having a valve seat at one end thereof, a rocker member rotatably mounted in said supporting structure on an axis perpendicular to that of said pipe, said member being slotted, a valve stem passing through the slot of said member, a valve head on said stem and adapted to close against said valve seat, an abutment carried by said valve stem and resting upon said rocker member, whereby turning of said member lifts said stem from said valve seat, a spring bearing upon said abutment and normally holding said valve head against said valve seat, an arm secured to said rocker member exteriorly of said supporting structure for turning said member, a bracket depending from said supporting structure, a rod passing through said bracket and attached to said arm, a barrel adjustably mounted on said rod, and a spring connecting said bracket and barrel to be tensioned by movement of said rod.

4. A valve comprising a rigid supporting structure, a pipe therein and having a valve seat at one end thereof, a rocker member rotatably mounted in said supporting structure on an axis perpendicular to that of said pipe, said member being slotted, a valve stem passing through the slot of said member, a valve head on said stem and adapted to close against said valve seat, an abutment carried by said valve stem and resting upon said rocker member, whereby turning of said member lifts said stem from said valve seat, a spring bearing upon said abutment and normally holding said valve head against said valve seat, an arm secured to said rocker member exteriorly of said supporting structure for turning said member, a bracket depending from said supporting structure, a rod passing through said bracket and attached to said arm, a spring connecting said bracket and rod to be tensioned by movement of said rod, and a buffer spring mounted on said rod and bearing against said arm.

5. A valve comprising a rigid supporting structure, a pipe therein and having a valve seat at one end thereof, a rocker member rotatably mounted in said supporting structure on an axis perpendicular to that of said pipe, said member being slotted, a valve stem passing through the slot of said member, a valve head on said stem and adapted to close against said valve seat, an abutment carried by said valve stem and resting upon said rocker member, whereby turning of said member lifts said stem from said valve seat, a spring bearing upon said abutment and normally holding said valve head against said valve seat, an arm secured to said rocker member exteriorly of said supporting structure for turning said member, a bracket depending from said supporting structure, a rod passing through said bracket and attached to said arm, a barrel adjustably mounted on said rod, a spring connecting said bracket and barrel to be tensioned by movement of said rod, and a buffer spring mounted on said rod and bearing against said arm.

HARRY M. GROOMES.